(12) United States Patent
Song et al.

(10) Patent No.: US 8,349,988 B2
(45) Date of Patent: Jan. 8, 2013

(54) LIQUID POLYURETHANE PREPOLYMERS USEFUL IN SOLVENT-FREE ADHESIVES

(75) Inventors: Zhengzhe Song, Vernon Hills, IL (US); Yingjie Li, Batavia, IL (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 12/841,572

(22) Filed: Jul. 22, 2010

(65) Prior Publication Data

US 2011/0014479 A1 Jan. 20, 2011

Related U.S. Application Data

(63) Continuation of application No. PCT/US2009/000631, filed on Jan. 23, 2009.

(60) Provisional application No. 61/023,690, filed on Jan. 25, 2008.

(51) Int. Cl.
*C08G 18/22* (2006.01)
*C08G 18/18* (2006.01)
*C08G 18/16* (2006.01)

(52) U.S. Cl. .......... 528/44; 528/49; 528/52; 528/54

(58) Field of Classification Search ............ 528/52, 528/49, 54, 44
See application file for complete search history.

(56) References Cited

U.S. PATENT DOCUMENTS

| 4,460,738 A | 7/1984 | Frentzel et al. | |
|---|---|---|---|
| 5,494,960 A * | 2/1996 | Rolando et al. | 524/591 |
| 5,527,616 A * | 6/1996 | Hatano et al. | 428/423.1 |
| 6,221,978 B1 * | 4/2001 | Li et al. | 525/452 |

FOREIGN PATENT DOCUMENTS

| EP | 119349 | 9/1984 |
|---|---|---|
| EP | 2025730 | 2/2009 |
| EP | 2098578 | 9/2009 |
| GB | 1150818 | 5/1969 |
| JP | 2002-212534 | 7/2002 |
| WO | 2008065921 | 6/2008 |

OTHER PUBLICATIONS

International Search Report issued for International Patent Application No. PCT/US2009/000631 mailed on Oct. 21, 2009.
Supplementary European Search Report mailed Jun. 25, 2012.

* cited by examiner

*Primary Examiner* — Thao T. Tran
(74) *Attorney, Agent, or Firm* — Steven C. Bauman

(57) ABSTRACT

Substrates, particularly low surface energy substrates, can be bonded using certain solvent-free liquid polyurethane adhesives. The adhesive cures through reaction with moisture and/or an active hydrogen-containing curing agent to form a tough, strong, thermoset polymer having excellent chemical and heat resistance. The adhesive is based on a polyurethane prepolymer obtained by reacting a stoichiometric excess of at least one polyfunctional isocyanate having a functionality of less than 2.2 with at least one polyether polyol and at least one polyester polyol containing isophthalic acid moieties but relatively few if any phthalic acid or terephthalic acid moieties.

7 Claims, No Drawings

US 8,349,988 B2

LIQUID POLYURETHANE PREPOLYMERS USEFUL IN SOLVENT-FREE ADHESIVES

FIELD OF THE INVENTION

The invention relates to polyurethane prepolymers that are liquid at room temperature and which are useful in the preparation of solvent-free adhesives that can be cured by exposure to moisture or active hydrogen-containing curing agents and that exhibit surprisingly good adhesion to low surface energy surfaces such as certain acrylonitrile-butadiene-styrene copolymer (ABS) surfaces.

DISCUSSION OF THE RELATED ART

Because of the environmental, health and safety impact of solvent-borne adhesives, it has long been recognized as desirable to replace such adhesives with solvent-free alternatives. However, this has proven to be a non-trivial task. Besides other helpful effects, the solvents in such system help the wetout of the adhesives to the substrate surface and give rise to good adhesion. It is extremely challenging to develop a solvent-free adhesive which provides excellent adhesion to a variety of substrates, especially difficult-to-bond substrates.

BRIEF SUMMARY OF THE INVENTION

A solvent-free liquid curable polyurethane adhesive has been developed that is remarkably useful for bonding low surface energy substrates such as low surface energy acrylonitrile-butadiene-styrene copolymer (ABS) substrates. The adhesive cures through reaction with moisture and/or active hydrogen-containing curing agents to form a tough, strong, thermoset polymer having excellent chemical and heat resistance. This adhesive is a good candidate for replacing solvent-based liquid urethanes which are widely used to bond low surface energy substrates. The adhesive of the present invention is based on a polyurethane prepolymer obtained by reacting a stoichiometric excess of at least one polyfunctional isocyanate having a functionality of less than 2.2 with at least one polyether polyol and at least one polyester polyol containing isophthalic acid (i.e., m-phthalic acid) moieties.

DETAILED DESCRIPTION OF CERTAIN EMBODIMENTS OF THE INVENTION

It has unexpectedly been found out that a solvent-free liquid polyurethane adhesive derived from a polyester polyol containing isophthalic acid moieties and a polyfunctional isocyanate with a functionality of less than 2.2, and cured by reaction with water or an active hydrogen-containing curing agent bonds very well to low surface energy substrates such as certain ABS substrates. This result was surprising, as solvent-free liquid polyurethane adhesives derived from polyester polyols which contain significant amounts of phthalic acid moieties and/or terephthalic acid moieties but insignificant amounts of isophthalic acid moieties tend to bond poorly to low surface energy substrates even when a polyisocyanate with functionality of the polyfunctional isocyanate less than 2.2 is utilized in the preparation of such adhesives.

As used herein, the term "moieties" means residues or repeating units in a polymer obtained as a result of reaction of and incorporation into such polymer of a reactant used in the preparation of the polymer. For example, "isophthalic acid moieties" means moieties derived from isophthalic acid (or reactive equivalent thereof, such as an alkyl ester of isophthalic acid) having the structure —C(=O)—Ar—C(=O)—O— wherein Ar is a benzene ring and the two substituents are attached to the benzene ring in positions that are meta to each other.

The reactants used to synthesize the polyurethane prepolymer of the present invention should be selected such that the resulting polyurethane prepolymer is liquid at room temperature. The polyurethane prepolymer is substantially linear in structure in preferred embodiments of the invention, with little or no branching. The polyurethane prepolymer is terminated with NCO (isocyanate) groups and typically has an isocyanate content of from about 1 to about 15 weight percent or from about 5 to about 10 weight percent. The viscosity of the polyurethane prepolymer typically is from about 5000 to about 25,000 centipoise at 25 degrees C.

Suitable polyether polyols include oligomers and polymers containing a plurality of oxyalkylene repeating units such oxyethylene, oxypropylene, oxybutylene and/or oxytetramethylene and hydroxyl end groups. Preferably, difunctional polyether polyols (i.e., polyether polyols containing two hydroxyl groups per molecule) are employed. Illustrative polyether polyols are polyethylene glycols, polypropylene glycols, polytetramethylene glycols, polyethylene/propylene glycols (having a random, block or end-capped structure) and the like, with a number average molecular weight from about 200 to about 8000 or from about 400 to about 4000. As is well known in the art, such polyether polyols can be prepared by ring-opening polymerization of cyclic oxygen-containing compounds such as ethylene oxide, propylene oxide, butylene oxide and tetrahydrofuran, often in the presence of an initiator such as a monomeric diol. The amount of polyether polyol used to prepare polyurethane prepolymers in accordance with the present invention can be about 5 to 80, alternatively from about 30 to 50, weight percent of the total weight of the reactants. Mixtures of different polyether polyols having different chemical structures and/or different average molecular weights can be used.

Suitable isophthalic acid moiety-containing polyester polyols may be prepared by reacting isophthalic acid with one or more polyols (particularly diols). Other diacids, particularly aliphatic and cycloaliphatic dicarboxylic acids such as adipic acid, can also be used, in addition to isophthalic acid (in the context of the present invention, the terms "isophthalic acid" and "diacids" include not only the free acids but also derivatives thereof such as anhydrides, esters, and halides that are also capable of undergoing condensation polymerization with polyols to form polyester polyols). However, it has been surprisingly found that the incorporation of significant amounts of phthalic acid moieties and/or terephthalic acid moieties in the polyester polyol provides a polyurethane prepolymer exhibiting poor adhesion. It is therefore preferred that the diacid component used to prepare the polyester polyol contains a total of less than 10 weight percent or less than 5 weight percent or less than 1 weight percent phthalic acid and/or terephthalic acid. In the context of the present invention, "substantially free of phthalic acid moieties and terephthalic acid moieties" means that such moieties represent less than 10 weight percent of the total diacid moieties in the polyester polyol. It is further preferred that at least about 30 weight percent or at least about 40 weight percent of the diacid component used to prepare the polyurethane prepolymer be isophthalic acid. The aforementioned isophthalic acid moiety-containing polyester polyol can be used alone (i.e., as the only type of polyester polyol) but also in combination with other types of polyester polyols as well. In preferred embodiments, however, the aforementioned isophthalic acid moiety-containing polyester polyol represents at least 50 weight percent or at least 75 weight percent or at least 90 weight percent or even 100 weight percent of the total amount of polyester polyol used in the preparation of the liquid polyurethane prepolymer. In one embodiment of the invention, the diacid component used to synthesize the isophthalic acid moiety-containing polyester polyol comprises isophthalic acid and adipic acid in a weight ratio of from about 30:70 to about 70:30, or from about 40:60 to about 60:40, or about 50:50. Various diols may be used as the polyol component for the production of the polyester polyol. They include, for example, aliphatic alcohols as well as aromatic alcohols containing two OH groups per molecule. The OH groups may be primary and/or secondary. Suitable aliphatic alcohols include, for example, ethylene glycol, propylene glycol, butane-1,4-diol, pentane-1,5-diol, hexane-1,6-diol, heptane-1,7-diol, octane-1,8-diol and higher homologs or isomers thereof which can be obtained by extending the hydrocarbon chain by one $CH_2$ group at a time or by introducing branches into the carbon chain. Other suitable diols include neopentyl glycol, diethylene glycol, polyethylene glycol, dipropylene glycol, polypropylene glycol, 1,4-cyclohexanediol, 1,4-cyclohexane dimethanol, bisphenol A and hydrogenated derivatives thereof, bisphenol F and hydrogenated derivatives thereof and the like. The total amount of polyester polyol typically ranges from 5 to 80, alternatively from 10 to 70, percent of the total weight of reactants used to prepare the liquid polyurethane prepolymer of this invention.

The preferred polyisocyanate used to prepare the polyurethane prepolymer is an isocyanate or mixture of isocyanates having an average functionality (number of isocyanate functional groups per molecule) which is lower than 2.2, such as a difunctional isocyanate. For reasons that are not fully understood, the use of a polyfunctional isocyanate with a functionality of 2.2 or higher will not provide a polyurethane prepolymer capable of exhibiting good adhesion to a low surface energy substrate.

Preferably, the polyisocyanate is an aromatic diisocyanate such as pure 4,4'-diphenylmethane diisocyanate, commercially available under the trade name Rubinate® 44. Other suitable polyisocyanates include toluene diisocyanate, 1,4-diisocyanatobenzene (PPDI), 2,4'-diphenylmethane diisocyanate, 1,5-naphthalene diisocyanate, purified polymeric MDI (having an average functionality less than 2.2), bitolylene diisocyanate, 1,3-xylene diisocyanate, p-TMXDI, 1,6-diisocyanato-2,4,4-trimethylhexane, CHDI, BDI, $H_6$XDI, IPDI, $H_{12}$MDI, and the like. Mixtures of different polyisocyanates can be utilized, provided the average functionality of such mixture is less than 2.2. The amount of the polyisocyanate typically ranges from 10 to 60, alternatively from 20 to 50, percent of the total weight of reactants used to prepare the liquid polyurethane prepolymers of this invention. Such amount should be selected such that there is a stoichiometric excess of NCO (isocyanate) groups in the reactant mixture used to prepare the polyurethane prepolymer as compared to the number of functional groups capable of reacting with the NCO groups (e.g., the hydroxyl groups present in the polyester polyol and polyether polyol components reacted with the polyisocyanate component). For example, the NCO:OH ratio can be greater than 1.1:1 or greater than 1.2:1 or even higher, with the ratio being selected so as to control the NCO content and average molecular weight attained in the polyurethane prepolymer thereby obtained as may be desired.

The liquid polyurethane prepolymers of this invention can be used directly without further modification as moisture curable adhesives, but can, if so desired, also be formulated into adhesives by combining with compatible additives. Such additives may include catalysts, plasticizers, oils, colorants, fillers, UV dyes, rheology modifiers (e.g., thickeners), foam-controlling agents, foaming (blowing) agents, dehydrating agents, coupling agents, adhesion promoting agents, other types of polyurethane prepolymers, additional polyisocyanate and other non-reactive or reactive additives, and any other additives known to one skilled in the liquid polyurethane adhesive field. However, the formulated adhesive should not contain any significant amount of solvent, i.e., any inert organic compound having a boiling point less than 200 degrees C. at atmospheric (normal) pressure. In preferred embodiments, the adhesive contains less than 1 weight % or less than 0.5 weight % or less than 0.1 weight % solvent.

In one embodiment of the invention, the liquid polyurethane prepolymer may be cured by combining and reacting the prepolymer with one or more active hydrogen-containing curing agents. The adhesive may thus be formulated as a two component (2K) system, wherein a first component is comprised of the prepolymer and the second component is comprised of the curing agent with the components being stored separately but then combined shortly before utilizing the mixture as an adhesive. The curing agents in such embodiment are selected so as to be reactive with the prepolymer even at ambient or room temperature, with curing beginning to take place as soon as the components are mixed together. In another embodiment, however, the curing agent is latent, i.e., essentially non-reactive with the prepolymer at room temperature but activatable by heating the adhesive mixture to an elevated temperature. The use of a latent curing agent permits the formulation of a storage-stable adhesive that can be cured by heating.

The term "active hydrogen-containing curing agent" as used herein includes any organic compound having at least two active hydrogens per molecule capable of reacting with the isocyanate groups present in the polyurethane prepolymer. For the purposes of this invention, "active hydrogen" refers to a hydrogen atom which, because of its position in the molecule, displays significant activity according to the Zerewitnoff test described by Wohler in the Journal of the American Chemical Society, Vol. 49, p. 3181 (1927). Illustrative of active hydrogen-containing moieties are —COOH (carboxylic acid), —OH (hydroxyl), —$NH_2$ (primary amino), —NH— (secondary amino), —$CONH_2$ (amido), —SH (thiol), and —CONH— (amido). Preferable active hydrogen-containing compounds include polyols, polyamines, polymercaptans and polyacids, which may be monomeric, oligomeric and/or polymeric in character. For example, polyether polyols, polyester polyols, as well as polyetherester polyols may be utilized. Examples of amino-group containing curing agents include both aromatic and aliphatic diamines, primary and secondary amine terminated polyether polyols, and difunctional, trifunctional, and polymeric amines. The type and amount of active hydrogen-containing curing agent combined with the polyurethane prepolymer may be selected and varied as needed to achieve the desired characteristics and properties in the cured adhesive. For example, the stoichiometric ratio of active hydrogen groups to isocyanate groups may be within the range of from about 0.5:1 to about 1.5:1.

In one embodiment of the invention, partial curing of the polyurethane prepolymer is accomplished through reaction with one or more active hydrogen-containing curing agents, with further curing being attained by reaction of the remaining isocyanate groups with moisture.

As the polyurethane prepolymer contains reactive isocyanate groups, it and any adhesive formulated therefrom will be sensitive to airborne moisture. Therefore, it is necessary to protect it from moisture during storage, by storing it, for example, in a sealed, dry and moisture-proof container until it is ready to be dispensed and applied to a substrate surface.

The adhesives of the present-invention are particularly useful for forming strong bonds to low surface energy substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene, styrene copolymers (e.g., ABS plastics), polyvinyl chloride, and polymethylmethacrylate. Other substrates may also have low surface energy properties due to the presence on the substrate surface of a residue or contaminate, such as an oil, mold release, or processing aid residue, or a film such as a paint. However, even though the present adhesive bonds well to low surface energy surfaces, the invention is not limited to the bonding of low surface energy substrates, as it has been found that the inventive adhesive can also bond very effectively to other types of substrates such as, for example, other plastics, elastomers, thermosets, ceramics (e.g., glass), wood and metals (e.g., aluminum, steel). The substrates may be in any suitable or desired form such as films, strips, sheets, panels, dimensional shapes, or the like. The assemblies formed by joining substrates using the adhesives of the present invention may be laminates, composites, or the like.

The adhesive of the present invention may be applied to substrate surfaces using any of the application techniques known in the liquid adhesive art, including but not limited to brushing, roller coating, extrusion and spraying. The substrate surface may be coated with the adhesive so as to form a continuous or discontinuous layer of adhesive on the substrate surface, the thickness of such layer being controlled as may be desired based on the target properties of the final assembly containing the cured adhesive. Typically, the adhesive layer is from about 0.01 to about 0.5 mm thick. Following application of such adhesive layer, a surface of a second substrate may be brought into contact with the adhesive layer (such contacting being preferably enhanced by application of pressure) so as to form an assembly of a first substrate and a second substrate with the adhesive layer therebetween.

Curing of the adhesive may be carried out using various conditions. In particular, curing (involving reaction of the free NCO groups in the polyurethane prepolymer) can be achieved through exposure to moisture from the atmosphere and/or in or from the substrate surfaces. To accelerate the curing process, additional moisture may be introduced to the substrate surfaces prior to application of the adhesive and/or the assembly may be exposed to atmospheric humidity levels greater than would normally exist (by placing the assembly in a humidity chamber, for example) and/or the assembly may be heated at a temperature higher than room temperature and/or the adhesive may be formulated with one or more catalysts capable of increasing the reaction rate of water and the isocyanate groups. Similarly, where an active hydrogen-containing curing agent is employed, curing of the adhesive can be accelerated through heating and/or the use of catalysts.

EXAMPLES

The invention is further illustrated by the following examples.
Materials:
PIOTHANE 50-2000HAI, available from Panolam Industries, is a partially crystalline copolyester glycol obtained by reacting adipic acid, isophthalic acid, and 1,6-hexane diol having an adipic acid to isophthalic acid weight ratio of 50:50, a nominal molecular weight of about 2,000, and a melting point of about 30° C.
Dynacoll® 7360, available from Degussa, is a crystalline copolyester based on adipic acid and hexanediol having a molecular weight of about 3500 and melting point of about 55° C.
Dynacoll® 7340, available from Degussa, is a crystalline copolyester based on terephthalic acid, adipic acid and hexanediol having a molecular weight of about 3500 and melting point of about 96° C.
DESMOPHEN-S-1028-55, available from Bayer, is a liquid polyester based on phthalic anhydride and hexanediol having a molecular weight of about 2000.
ACCLAIM POLYOL 2000 ("PPG 2000"), available from Bayer, is a polypropylene glycol having a molecular weight of about 2000.
Dibutyltin dilaurate (DBTDL), available from Mooney Chemicals, Inc., is a diorganotin catalyst.
2,2'-Dimorpholinodiethyl ether (DMDEE), available from Huntsman Corp. is a morpholino-containing catalyst.
Rubinate® 44, available from Huntsman corp, is pure 4,4'-diphenylmethane diisocyanate (MDI).
MONDUR MRS, available from Bayer, is a polymeric MDT with an NCO content of about 33% and an average functionality of 2.2.
Preparation of Polyurethane Prepolymers:

All the polyurethane prepolymers in the following examples were prepared using the method described below with only the relative amounts and specific types of reactants being changed for each example. All polyols are added to a mixer and heated with stirring. The mixture is dehydrated under vacuum at about 100° C. for 30 min. The temperature of the mixture is lowered to about 50° C. and then the polyisocyanate is added, immediately followed by adding DBDTL. The reaction is continued about 30 minutes at the temperature range of 70° C. to 95° C. The temperature of the reactants is lowered to about 60° C. and DMDEE is added with stirring for 15 minutes.
Tests:

A sample of the reaction product is applied to a 1 inch by 2 inch strip of Prime ABS Weather-X 200, available from Primex Plastics Corp. in Georgia. Another 1 inch by 2 inch strip of this ABS material is put on top of the coated strip in a cross-over way to create a 1 inch by 1 inch bonding area. The bonded assembly is stored at room temperature and about 30% to 60% humidity for 3 days before testing. The samples are then tested to determine the qualitative strength.

Table 1 lists all the examples prepared using the different formulations. The bonding strengths for the reaction products of Examples 1 to 6 were measured using the method described as above. The bonding strength is rated as excellent if the bonded part cannot be separated by hand, good if the part can be separated by hand but only using significant force, and poor if the part can be separated easily by hand.

The data in Table 1 demonstrate two interesting and unexpected points. The first point is that the presence of isophthalic acid moieties in the polyester polyol leads to an adhesive capable of effectively bonding to low surface energy ABS substrates. The second is that even when a isophthalic acid moiety-containing polyester polyol is employed, only when a polyisocyanate with functionality lower than 2.2 is also utilized will an adhesive be obtained that is capable of strongly bonding to a low surface energy ABS substrate (compare Example 5 with Example 1). Although the adhesive of Example 3 exhibited good bond strength, it was not fully liquid at 25 degrees C. and had a relatively high viscosity even at 30 degrees C.

As a further comparison, the bonding strength of a conventional commercially available solvent-based moisture-curable polyurethane adhesive currently being used in the panel lamination market was evaluated in Example 7. Even though this adhesive contains solvent, poor bonding strength was observed.

TABLE 1

| Component | Example 1 Weight (%) | Example 2* Weight (%) | Example 3* Weight (%) | Example 4* Weight (%) | Example 5* Weight (%) | Example 6* Weight (%) | Example 7* |
|---|---|---|---|---|---|---|---|
| PPG-2000 | 54.925 | 69 | 54.925 | 54.925 | 54.925 | 54.925 | |
| Piothane 50-2000HAI | 15 | | | | | 15 | |
| Dynacoll 7360 | | | 15 | | | | |
| Dynacoll 7340 | | | | 15 | | | |
| Desmophen-S-1028-55 | | | | | 15 | | |
| Rubinate 44 | 30 | 30.925 | 30 | 30 | 30 | | |
| MRS-2 | | | | | | 30 | |
| DBTDL | 0.05 | 0.05 | 0.05 | 0.05 | 0.05 | 0.05 | |
| DMDEE | 0.025 | 0.025 | 0.025 | 0.025 | 0.025 | 0.025 | |
| Viscosity @ 25° C. (cps) | 14,500 | 13,000 | 62500 @ 30° C. | 19,000 | 14,250 | 22,250 | |
| NCO % | 7.15 | 7.49 | 7.43 | 7.43 | 7.14 | 6.98 | |
| Physical form @ 25° C. | liquid | liquid | liquid @ 30° C. | liquid | liquid | liquid | liquid |
| TR Bond Strength | excellent | poor | good | poor | poor | poor | poor |

*Comparative example

What is claimed is:

1. A solvent free curable polyurethane prepolymer liquid at room temperature prepared as a reaction product obtained by reacting a stoichiometric excess of 4,4'-diphenyl methane diisocyanate having an average functionality of less than 2.2 with at least one polyether polyol and a polyester polyol obtained by reacting adipic acid, isophthalic acid and 1,6-hexanediol having an adipic acid to isopthalic acid weight ratio of about 1:1, which is substantially free of phthalic acid moieties and terephthalic acid moieties.

2. The liquid polyurethane prepolymer of claim 1 wherein the 4,4'-diphenyl methane diisocyanate has an average functionality of about 1.9 to about 2.1.

3. The liquid polyurethane prepolymer of claim 1 wherein the 4,4'-diphenyl methane diisocyanate is from about 20 to about 50% of the total weight of the 4,4'-diphenyl methane diisocyanate, at least one polyether polyol, and the polyester polyol.

4. The liquid polyurethane prepolymer of claim 1 wherein the polyether polyol is from about 30 to about 70% of the total weight of the polyfunctional isocyanate, at least one polyether polyol, and at least one polyester polyol.

5. The liquid polyurethane prepolymer of claim 1 wherein the at least one polyether polyol has a number average molecular weight of about 200 to about 8000.

6. The liquid polyurethane prepolymer of claim 1 wherein the weight ratio of isophthalic acid to adipic acid in the polyester polyol is from 30:70 to 70:30.

7. The liquid polyurethane prepolymer of claim 1 wherein the polyester polyol has a number average molecular weight from about 500 to about 10,000.

* * * * *